US012663696B2

(12) United States Patent
Wang

(10) Patent No.: US 12,663,696 B2
(45) Date of Patent: Jun. 23, 2026

(54) LIGHT SOURCE ANGLE-ADJUSTMENT DEVICE AND PHOTOGRAPHING MODULE

(71) Applicant: ALPHA NETWORKS INC., Hsinchu (TW)

(72) Inventor: Chao-Hsi Wang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 24 days.

(21) Appl. No.: 18/928,590

(22) Filed: Oct. 28, 2024

(65) Prior Publication Data

US 2025/0370313 A1     Dec. 4, 2025

(30) Foreign Application Priority Data

Jun. 3, 2024     (TW) ................................. 113120509

(51) Int. Cl.
*G03B 15/03*          (2021.01)
*G02B 26/08*          (2006.01)
*G03B 17/12*          (2021.01)

(52) U.S. Cl.
CPC ......... *G03B 15/03* (2013.01); *G02B 26/0816* (2013.01); *G03B 17/12* (2013.01);
(Continued)

(58) Field of Classification Search
CPC .................... G03B 15/03; G03B 17/12; G03B 2215/0567; G03B 2215/0585; G03B 15/05; G03B 15/02; G02B 26/0816
See application file for complete search history.

(56) References Cited

U.S. PATENT DOCUMENTS 4,068,245 A * 1/1978 Ohtaki ..................... G03B 9/70
                                                              396/61
2007/0297777 A1* 12/2007 Lee ........................ G03B 15/02
                                                              396/4
(Continued)

FOREIGN PATENT DOCUMENTS

CN          104284062 A       1/2015
JP          2001-272716 A     10/2001
(Continued)

OTHER PUBLICATIONS

European Search Report for European Application No. 24 20 9493.6, dated Apr. 14, 2025.
(Continued)

*Primary Examiner* — Hung H Lam
(74) *Attorney, Agent, or Firm* — Birch, Stewart, Kolasch & Birch, LLP

(57)          ABSTRACT

A light source angle-adjustment device is adapted to be disposed adjacent to a camera lens and includes a light-emitting member, a reflecting member, and a driving member. The light-emitting member has a light outlet. A light of the light-emitting member is emitted from the light outlet along a light path. The light outlet faces away from the camera lens and faces the reflecting member. The reflecting member is disposed in the light path of the light-emitting member. The reflecting member has a reflecting surface reflecting the light emitted by the light-emitting member. The driving member is connected to the reflecting member and drives the reflecting member to rotate around an axis to change an angle provided between the light path and the reflecting surface.

9 Claims, 5 Drawing Sheets

(52) U.S. Cl.
      CPC ................ *G03B 2215/0567* (2013.01); *G03B 2215/0585* (2013.01)

(56)                References Cited

U.S. PATENT DOCUMENTS

| | | | | |
|---|---|---|---|---|
| 2013/0301235 A1 * | 11/2013 | Harooni | ................. | G06F 1/166 |
| | | | | 362/11 |
| 2016/0112616 A1 * | 4/2016 | Bonifer | ................. | H04N 23/56 |
| | | | | 348/77 |
| 2018/0279942 A1 * | 10/2018 | Houjou | ............... | A61B 5/0064 |

FOREIGN PATENT DOCUMENTS

| | | | | | | |
|---|---|---|---|---|---|---|
| JP | 2005-326451 A | | 11/2005 | | | |
| JP | 2010-39025 A | | 2/2010 | | | |
| JP | 2010039025 A | * | 2/2010 | ............. | H04N 23/75 |
| WO | WO 2022/142356 A1 | | 7/2022 | | | |

OTHER PUBLICATIONS

Taiwanese Search Report for Taiwanese Application No. 113120509, dated Nov. 12, 2025, with English translation.

\* cited by examiner

A1(A3)

LIGHT SOURCE ANGLE-ADJUSTMENT DEVICE AND PHOTOGRAPHING MODULE

BACKGROUND OF THE INVENTION

Technical Field

The present invention relates generally to photographing technology, and more particularly to a light source angle-adjustment device.

Description of Related Art

Photographing modules, such as cameras, typically include a fill light device. The fill light device is adapted to emit light along a photographing direction for filling when ambient light is insufficient, so that an image capturing range of the photographing module is provided with evenly distributed and sufficient light.

However, when filling light is reflected by objects in the environment to intensely enter the camera lens during filling, overexposure may be resulted, thereby causing loss of details of a dark portion in an image. When a light source of the fill light device is turned off, loss of details of the dark portion in the image may be similarly resulted. As a result, the problem of insufficient or unevenly distributed ambient light remains unsolved.

Therefore, how to provide a fill light device which could adapt to different environments, has become a major problem in the industry.

BRIEF SUMMARY OF THE INVENTION

In view of the above, the primary objective of the present invention is to provide a light source angle-adjustment device which could adjust an emission angle of a light source to provide suitable assisting light for different environments.

The present invention provides a light source angle-adjustment device adapted to be disposed adjacent to a camera lens. The light source angle-adjustment device includes a light-emitting member, a reflecting member, and a driving member. The light-emitting member has a light outlet. A light of the light-emitting member is emitted from the light outlet along a light path. The light outlet faces away from the camera lens and faces the reflecting member. The reflecting member is disposed in the light path of the light-emitting member. The reflecting member has a reflecting surface. The reflecting surface reflects the light emitted by the light-emitting member. The driving member is connected to the reflecting member, The driving member drives the reflecting member to rotate around an axis to change an angle provided between the light path and the reflecting surface.

The present invention further provides a photographing module including a plurality of light source angle-adjustment devices and a camera lens. The light source angle-adjustment devices are disposed to surround the camera lens.

With the aforementioned design, the driving member could drive the reflecting member to rotate around the axis to change the angle between the light path and the reflecting surface. When the light-emitting member performs filling and the filling light is reflected by the environment to intensely enter the camera lens and causes overexposure, the reflecting member could be controlled to rotate to keep the filling light away from the reflecting objects in the environment, thereby preventing the filling light from being reflected by the environment and intensely entering the camera lens. Therefore, overexposure could be resolved and filling is achieved when the ambient light is insufficient.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A photographing module 1 according to an embodiment of the present invention is illustrated in FIG. 1 to FIG. 5 and includes a plurality of light source angle-adjustment devices 10 and a camera lens 20. The light source angle-adjustment devices 10 are disposed to surround the camera lens 20.

Figure 1:
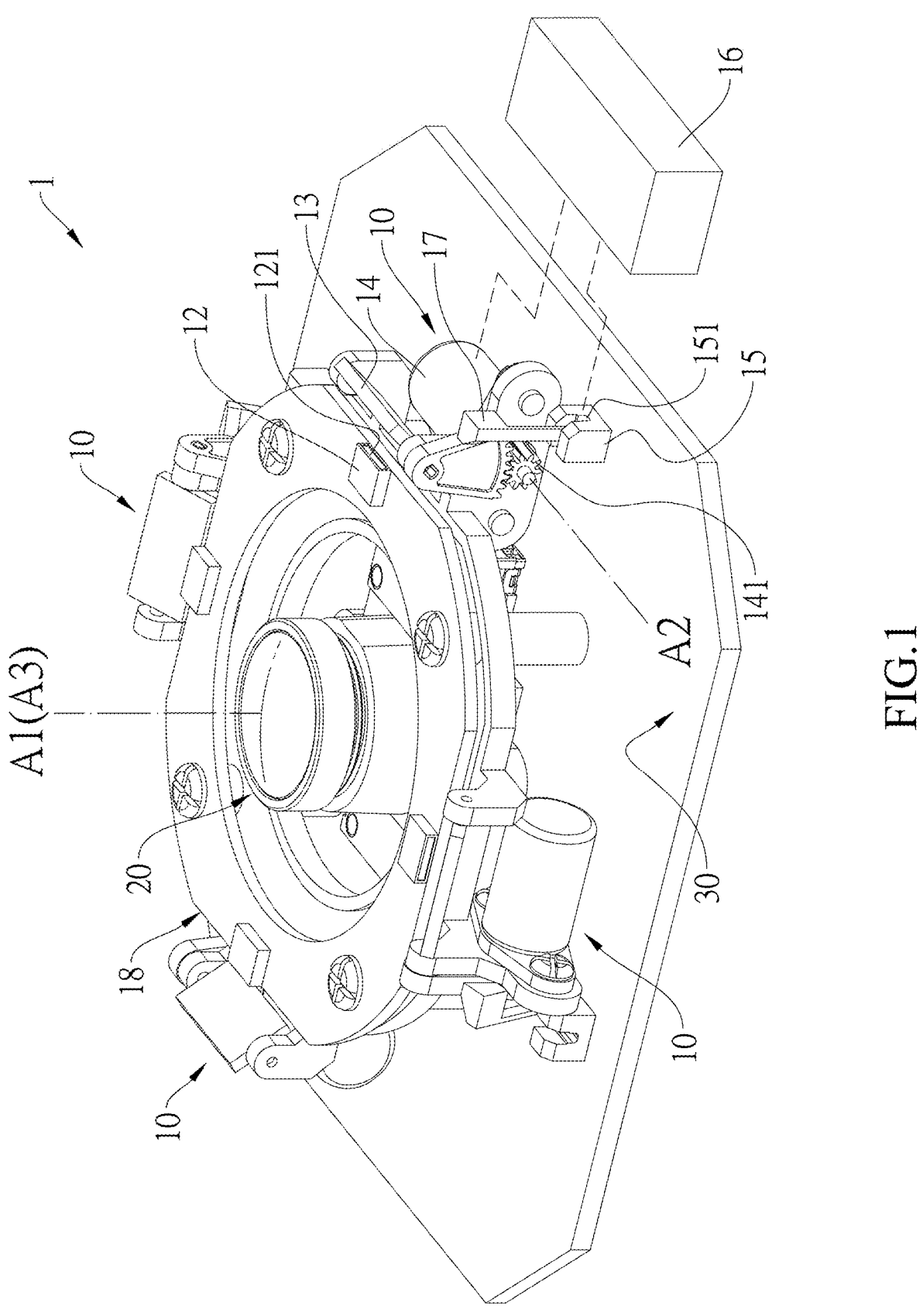
FIG. 1 is a perspective view of the photographing module according to an embodiment of the present invention.
Figure 2:
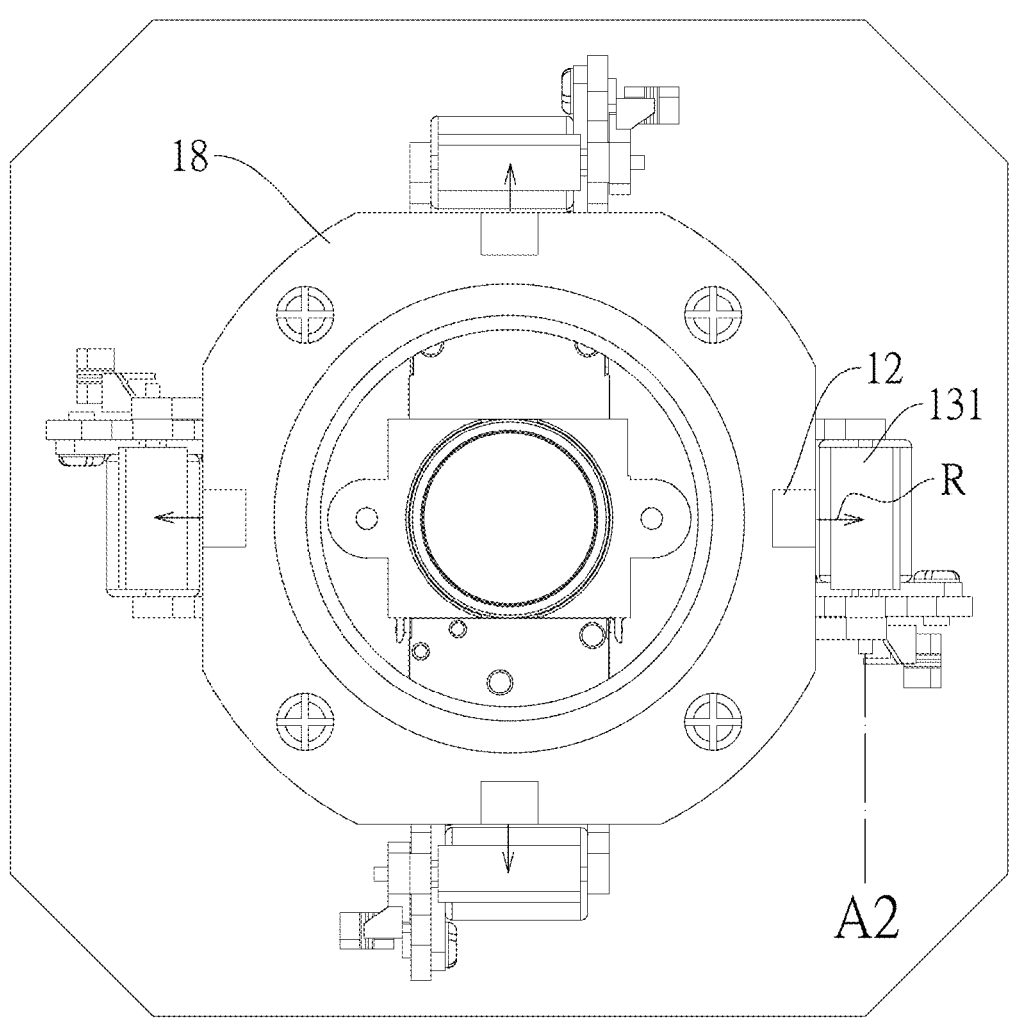
FIG. 2 is a top view of the photographing module according to the embodiment of the present invention.

Referring to FIG. 1 and FIG. 2, each of the light source angle-adjustment devices 10 is disposed adjacent to the camera lens 20. Each of the light source angle-adjustment devices 10 includes a light-emitting member 12, a reflecting member 13, and a driving member 14. The light-emitting member 12 has a light outlet 121. The light outlet 121 faces away from the camera lens 20 and faces the reflecting member 13. A light of the light-emitting member 12 is emitted from the light outlet 121 along a light path R. The light path R of the light-emitting member 12 is not parallel to an optical axis A1 of the camera lens. The reflecting member 13 is disposed in the light path R of the light-emitting member 12. The reflecting member 13 has a reflecting surface 131. The reflecting surface 131 could reflect the light emitted by the light-emitting member 12. The driving member 14 is connected to the reflecting member 13. The driving member 14 drives the reflecting member 13 to rotate around an axis A2 to change an angle provided between the light path R and the reflecting surface 131.

More specifically, the driving member 14 is controllable to drive the reflecting member 13 to rotate to different positions, so that the light emitted by the light-emitting member 12 could be reflected by the reflecting member 13 to different regions for filling. In this way, when the light-emitting member 12 performs filling and a filling light is reflected by an environment to intensely enter the camera lens 20 to cause overexposure, the reflecting member 13 could be controlled to rotate to keep the filling light away from reflecting objects in the environment, thereby preventing the filling light from being reflected by the environment and intensely entering the camera lens 20. Therefore, overexposure could be resolved and filling is achieved when ambient light is insufficient.

Figure 4:
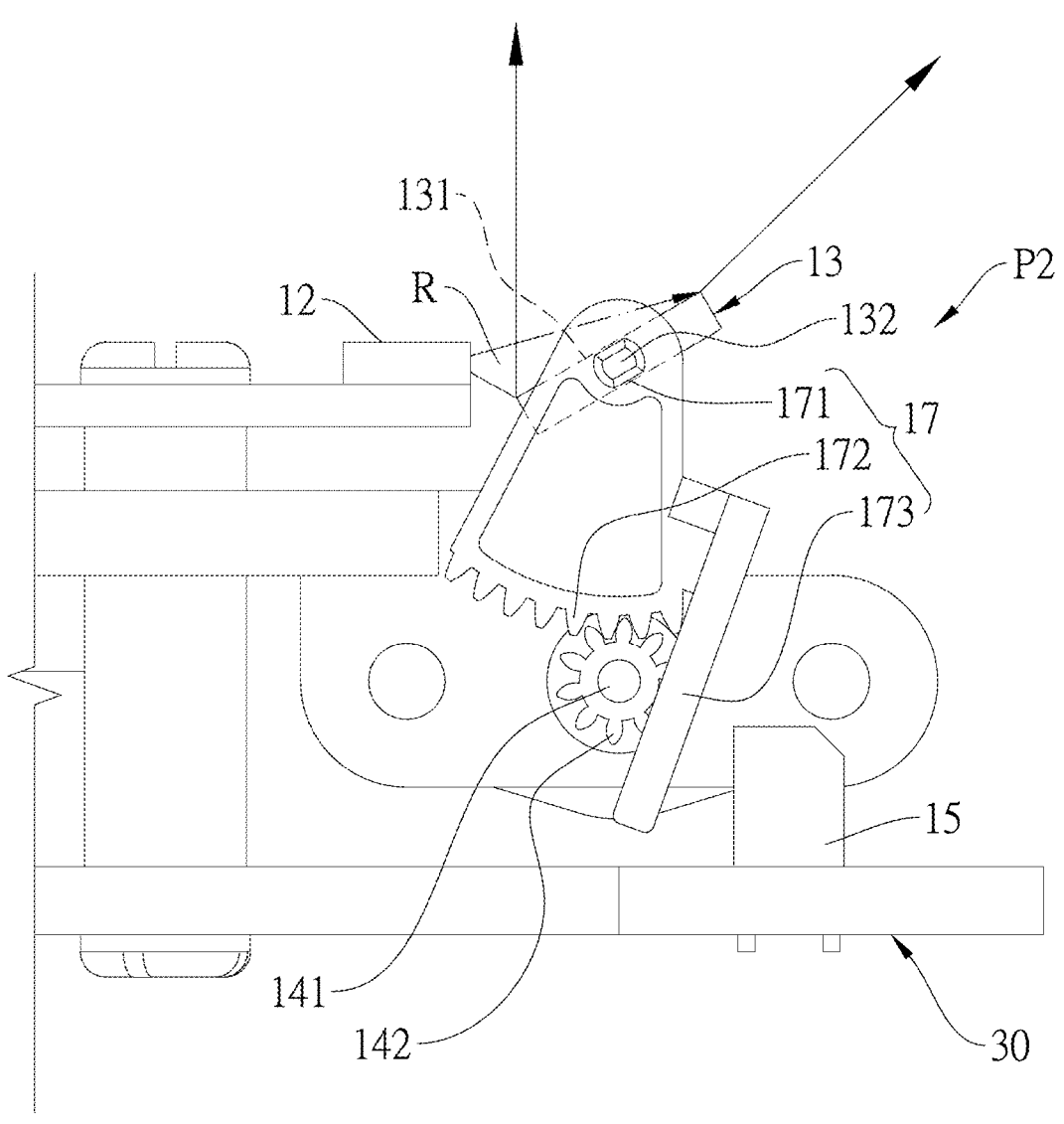
FIG. 4 is a partially exploded view of FIG. 3, showing that the reflecting member is at work position.
Figure 5:
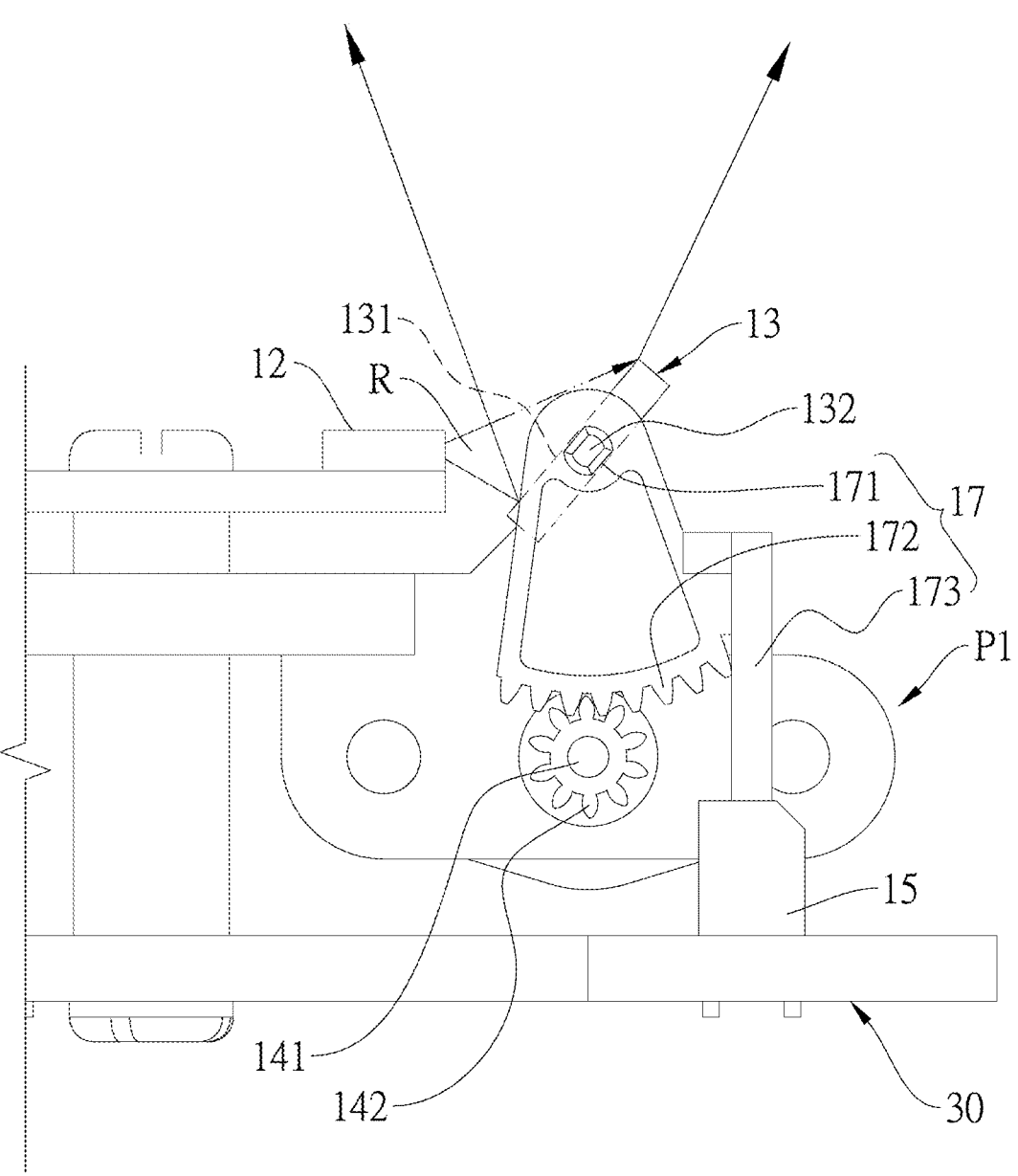
FIG. 5 is a partially exploded view of FIG. 3, showing that the reflecting member is at start position

Referring to FIG. 4 and FIG. 5, each of the light source angle-adjustment devices 10 includes a positioning member 15 disposed adjacent to the reflecting member 13. The reflecting member 13 could be driven by the driving member 14 to rotate between a start position P1 (referring to FIG. 5) and a work position P2 (referring to FIG. 4). The reflecting member 13 could be secured by the positioning member 15 to be located at the start position P1. The positioning member 15 could be a sensor adapted to sense a position of the reflecting member 13 or any component that could secure the reflecting member 13 at the start position P1.

In the current embodiment, the positioning member 15 is a sensor; more specifically, the positioning member 15 is a photo interrupter as an example. The photo interrupter is disposed on a mounting board 30 and is located adjacent to a side of the reflecting member 13. Each of the light source angle-adjustment devices 10 further includes a control member 16 and a trigger member 17. The control member 16 is respectively and electrically connected to the sensor and the driving member 14. The trigger member 17 is engaged with and operatively coupled to the reflecting member 13.

Referring to FIG. 4, a side edge of the reflecting member 13 has a rotation shaft 132 extending along the axis A2. The trigger member 17 has an engaging portion 171, a gear portion 172, and a trigger portion 173 that are connected to one another. The rotation shaft 132 of the reflecting member 13 is firmly engaged with and operatively coupled to the engaging portion 171. The gear portion 172 meshes with a driving gear 142 connected to a driving shaft 141 of the driving member 14. In this way, when the driving member 14 drives the driving gear 142 connected to the driving shaft 141 to rotate, the gear portion 172 could be rotated, thereby swinging the trigger portion 173. When the trigger portion 173 swings to a groove 151 of the photo interrupter (referring to FIG. 1), a light of the photo interrupter is blocked and the photo interrupter sends a sensed signal. The control member 16 could sense the position of the reflecting member 13 based on the sensed signal of the sensor and control the driving member 14 to stop operating, so that the reflecting member 13 could be positioned at the start position P1. Afterwards, the control member 16 could control the driving shaft 141 of the driving member 14 to rotate along another direction, so that the angle between the reflecting member 13 and the light path R of the light-emitting member 12 is adjusted, thereby changing a filling direction of the light-emitting member 12.

Referring to FIG. 2, in the current embodiment, the number of the light source angle-adjustment device 10 is four as an example, and the four light source angle-adjustment devices 10 are arranged in pairs, facing each other. In this way, the filling direction of each of the light-emitting members 12 could be adjusted along different directions, and the plurality of light source angle-adjustment devices 10 could cover a larger filling range. In other embodiments, the number of the light source angle-adjustment device 10 could be one or plural and is not limited to four in the current embodiment, which could also change the filling direction of the light-emitting member 12.

Figure 3:
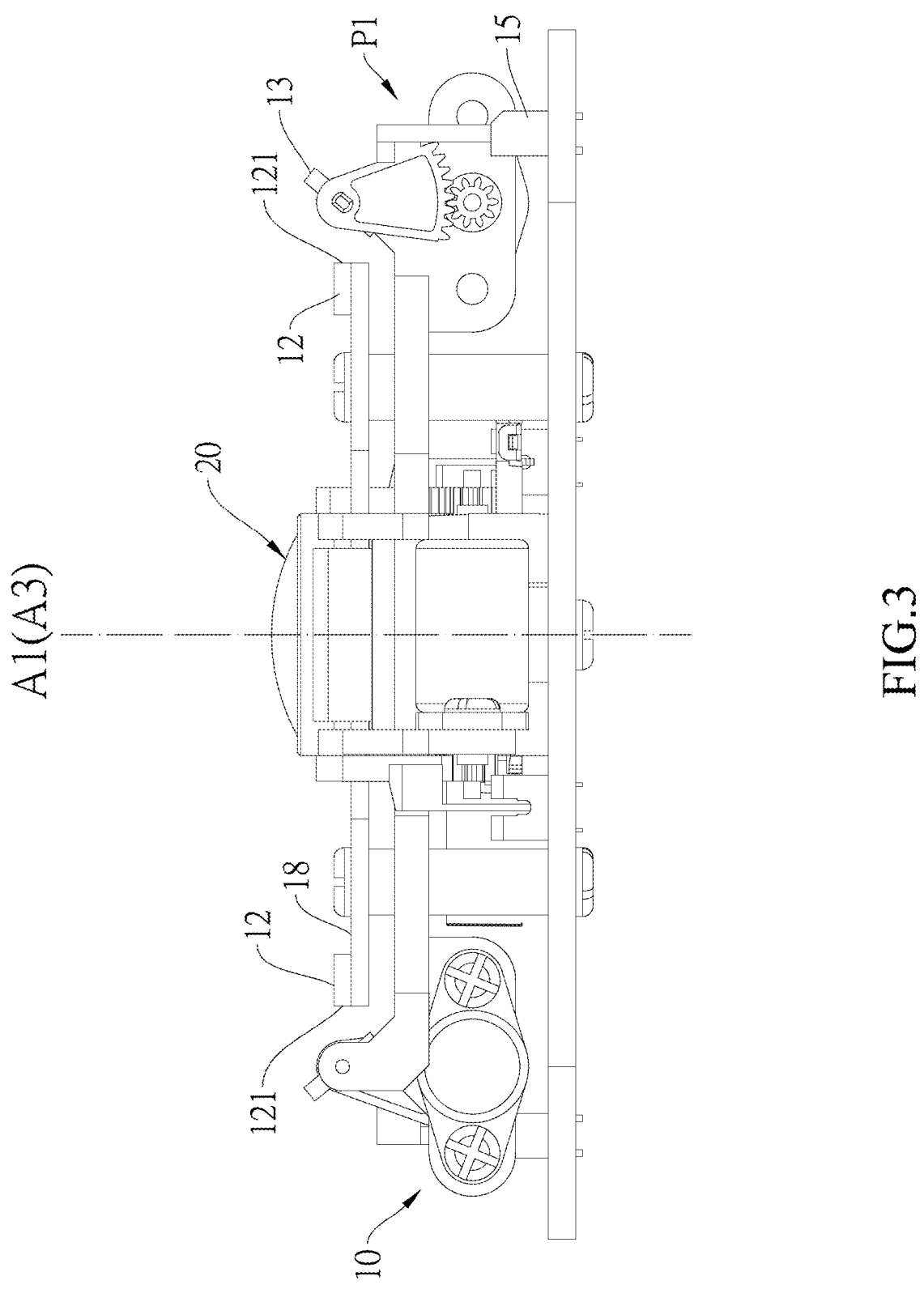
FIG. 3 is a side view of the photographing module according to the embodiment of the present invention.

Referring to FIG. 2 and FIG. 3, the photographing module 1 further includes an annular support 18. The annular support 18 surrounds a reference axis A3 to form a receiving space for receiving the camera lens 20. The light-emitting members 12 of the light source angle-adjustment devices 10 are disposed on the annular support 18 to surround the camera lens 20. The light-emitting members 12 are arranged in pairs, facing away from each other. An angle between the two light paths R of adjacent two of the light-emitting members 12 is 90 degrees. The light path R of each of the light-emitting members 12 is not parallel to the reference axis A3. The reflecting members 13 and the driving members 14 are disposed corresponding to the light-emitting members 12 in position and are disposed on a peripheral edge of the annular support 18 to surround the annular support 18.

In other embodiments, a support that is non-annular could be disposed. For example, each of the light source angle-adjustment devices 10 includes a support. The supports of the light source angle-adjustment devices 10 surround an outer peripheral edge of the camera lens 20 and are disposed between the camera lens 20 and the reflecting members 13. The light-emitting members 12 are correspondingly disposed on the supports.

In the current embodiment, the light-emitting member 12 is a visible LED as an example. In other embodiments, the light-emitting member 12 could be an infrared LED or other light sources. In the current embodiments, the driving member 14 is a stepper motor, but not limited thereto.

In the current embodiment, the reflecting surface 131 of the reflecting member 13 is a flat surface. In practice, in order to meet different optical requirements, the reflecting surface 131 of the reflecting member 13 could be a curved surface with a curvature, such as a convex surface and a concave surface. Moreover, in order to meet different optical requirements, the reflecting surface 131 of the reflecting member 13 could be provided with, for example, total internal reflection coating or partial reflection coating.

With the aforementioned design, the driving member 14 could drive the reflecting member 13 to rotate around the axis A2 to adjust the angle between the light path R and the reflecting surface 131. When the light-emitting member 12 performs filling and the filling light is reflected by the environment to intensely enter the camera lens 20 to cause overexposure, the reflecting member 13 could be controlled to rotate to keep the filling light away from the reflecting objects in the environment, thereby preventing the filling light from being reflected by the environment and intensely entering the camera lens 20. Therefore, overexposure could be resolved and filling is achieved when the ambient light is insufficient.

It must be pointed out that the embodiments described above are only some preferred embodiments of the present invention. All equivalent structures which employ the concepts disclosed in this specification and the appended claims should fall within the scope of the present invention.

What is claimed is:

1. A light source angle-adjustment device, adapted to be disposed adjacent to a camera lens, comprising:

a light-emitting member having a light outlet, wherein a light of the light-emitting member is emitted from the light outlet along a light path; the light outlet faces away from the camera lens;

a reflecting member disposed in the light path of the light-emitting member, wherein the reflecting member has a reflecting surface; the reflecting surface reflects the light emitted by the light-emitting member; the light outlet faces the reflecting member;

a driving member connected to the reflecting member, wherein the driving member drives the reflecting member to rotate around an axis to change an angle provided between the light path and the reflecting surface; and a positioning member and a control member, wherein the positioning member is a sensor; the control member is respectively and electrically connected to the sensor and the driving member; the sensor is disposed adjacent to the reflecting member and is adapted to sense a position of the reflecting member; the control member controls the driving member to operate based on a sensed signal of the sensor.

2. The light source angle-adjustment device as claimed in claim 1, wherein the positioning member is disposed adjacent to the reflecting member; wherein the reflecting member is driven by the driving member to rotate between a start position and a work position; the positioning member is adapted to secure the reflecting member at the start position.

3. The light source angle-adjustment device as claimed in claim 1, further comprising a trigger member, wherein the trigger member is engaged with and operatively coupled to the reflecting member; when the trigger member triggers the sensor, the control member controls the driving member to stop operating based on the sensed signal of the sensor.

4. The light source angle-adjustment device as claimed in claim 1, further comprising a support disposed between the camera lens and the reflecting member, wherein the light-emitting member is disposed on the support.

5. The light source angle-adjustment device as claimed in claim 1, wherein the reflecting surface is a flat surface or a curved surface with a curvature.

6. The light source angle-adjustment device as claimed in claim 1, wherein the light path of the light-emitting member is not parallel to an optical axis of the camera lens.

6

7. A photographing module, comprising:

a plurality of light source angle-adjustment devices as claimed in claim 1; and a camera lens, wherein the plurality of light source angle-adjustment devices are disposed to surround the camera lens.

8. The photographing module as claimed in claim 7, further comprising an annular support, wherein the annular support surrounds a reference axis to form a receiving space for receiving the camera lens; the light-emitting members of the plurality of light source angle-adjustment devices are disposed on the annular support to surround the camera lens; the reflecting members and the driving members of the plurality of light source angle-adjustment devices are disposed corresponding to the light-emitting members of the plurality of light source angle-adjustment devices and are disposed on a peripheral edge of the annular support to surround the annular support.

9. The photographing module as claimed in claim 8, wherein the light paths of the light-emitting members of the plurality of light source angle-adjustment devices are not parallel to the reference axis.

* * * * *